Patented Jan. 21, 1941

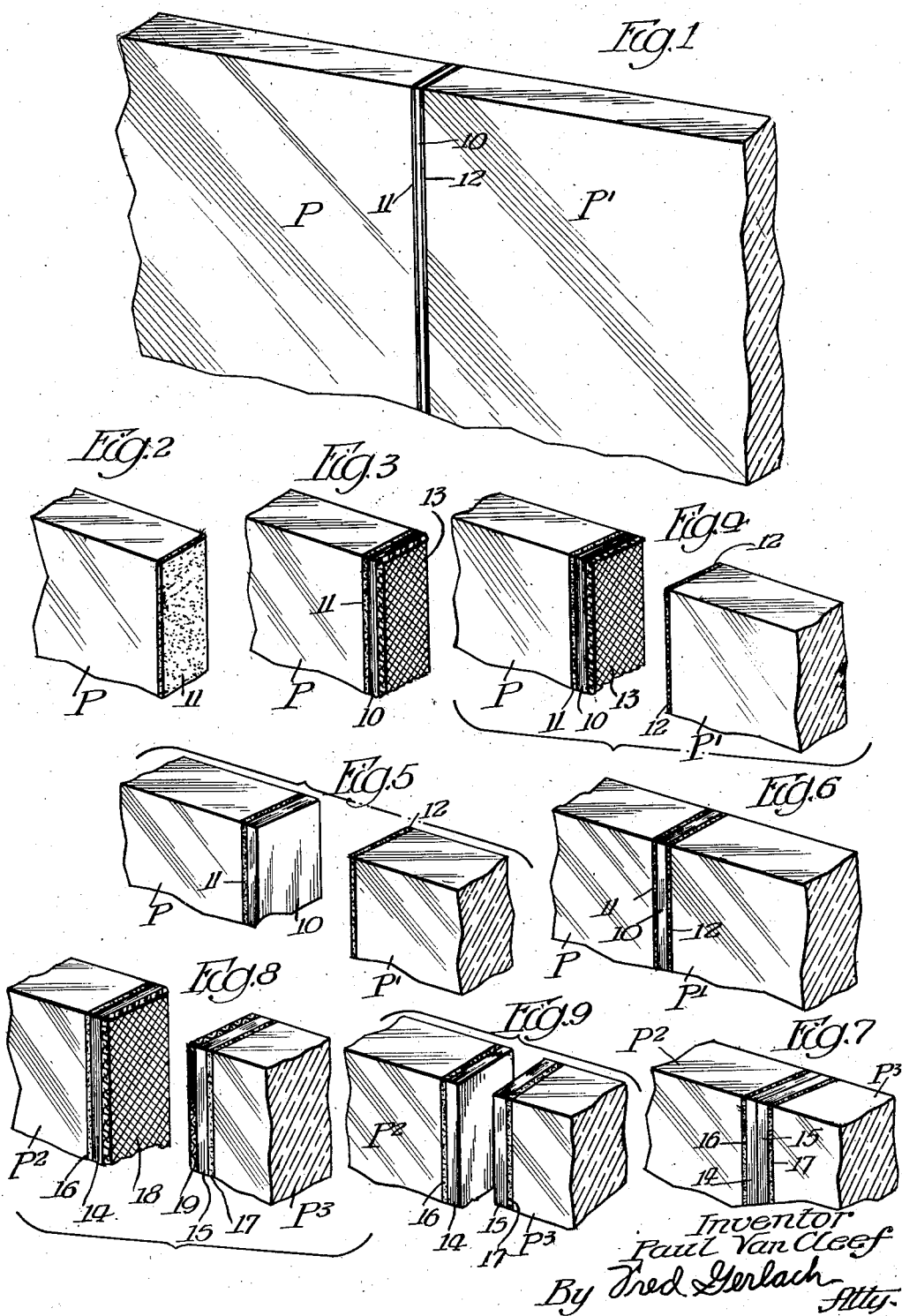

2,229,317

UNITED STATES PATENT OFFICE 2,229,317

PANEL JOINT AND METHOD OF MAKING SAME

Paul Van Cleef, Chicago, Ill., assignor to Van Cleef Bros., Chicago, Ill., a partnership consisting of Noah Van Cleef, Felix Van Cleef, and Paul Van Cleef Application June 17, 1938, Serial No. 214,201

9 Claims. (Cl. 72—37)

The present invention relates generally to joints. More particularly the invention relates to that type of joint which is employed or used in connection with edge to edge setting of a pair of panels of glass or other material and serves to form a seal or bond between the adjacent edges of the panels.

It has heretofore been customary in setting a pair of panels in edge to edge relation to employ an oily paste, or putty-like substance. This substance after mounting or setting of one of the panels in its operative position is spread by way of a spatula or other suitable tool on the proper edge of the mounted panel and then the other panel is mounted or set in its operative position and slid sideways so as to bring the edge thereof to be sealed into contact with the spread substance on the adjacent edge of the first mounted panel. Upon evaporation of the solvent for the substance a semi-plastic mass remains and this serves as a waterproof bond between the two panels. In practice it has been found that a joint of this character or type, although sufficiently permanent and waterproof for its intended purpose, is objectionable for three principal reasons. In the first place the joint is extremely difficult to form or make because the paste or putty-like substance sets quickly and is hard to spread evenly and uniformly. Secondly, the joint generally has voids or cavities between the spread substance and the adjoining edge of the second mounted panel because of commercial irregularities and high and low spots in the aforesaid panel edge, and such voids or cavities require filling with an additional quantity of the cementitious or joint forming substance. Thirdly, the joint due to the hardness or semi-plastic nature of the joint forming substance does not yield or expand readily in response to expansion and contraction of the two panels.

One object of the invention is to provide a joint of the type under consideration which may be applied with greater facility than, and eliminates the various objectionable features of, previously designed joints for the same purpose and in addition has certain inherent advantages over such joints such as greater durability and life and greater permanency.

Another object of the invention is to provide a joint of the aforementioned character which comprises a strip of unvulcanized rubber between the adjacent edges of the panels to which the joint is applied and in addition comprises thin coatings of permanently tacky cement which extend between and serve to bond together the side faces of the unvulcanized rubber strip and the aforesaid adjacent edges of the panels.

A further object of the invention is to provide a panel joint of the last mentioned character in which the coating forming cement is of the milled rubber-resin variety and is of such thinness or liquidity that it may be applied by way of a brush and flows readily over and hence effectively covers all portions of the adjoining edges of the panels and the side faces of the unvulcanized rubber strip.

A still further object of the invention is to provide a panel joint which is generally of new and improved design and is adapted to be partly prepared or formed in the shop or establishment where the panels are cut or fabricated prior to installation.

In addition it is contemplated as one of the objects of the invention to provide a simple and novel method of forming or making a joint of the aforementioned type and character, which includes as steps thereof applying to the proper edge of one of the panels a thin coating of permanently tacky rubber-resin type cement, then applying to the coated edge of the panel a strip of unvulcanized rubber with a coextensive facing of holland on the outer face thereof, then after installation or mounting of the strip-equipped panel removing the holland facing from the outer face of the unvulcanized rubber strip, then applying a coating of the cement to the proper edge of the other panel, and finally after mounting of the other panel in edge to edge relation with the one panel shifting it toward the one panel in order to bring the cement coating thereof into abutment and bonded or sealed relation with the opposed face of the unvulcanized rubber strip.

Other objects of the invention and the various advantages and characteristics of the present panel joint and its method of fabrication or manufacture will be apparent from a consideration of the following detailed description.

The invention consists in the several novel features which are hereinafter set forth and are more particularly defined by claims at the conclusion hereof.

In the drawing which accompanies and forms a component part of this specification or disclosure and in which like letters and numerals of reference denote corresponding parts throughout the several views:

Figure 1 is a fragmentary perspective view of a pair of panels arranged in edge to edge relation and having therebetween a joint embodying one form of the invention;

Figure 2 is a fragmentary perspective view showing one of the panels of Figure 1 after application to the proper edge thereof of a coating of permanently tacky rubber-resin type cement;

Figure 3 is another perspective view of the one panel showing applied to the cement coating a strip of unvulcanized rubber with a coextensive facing of holland on its outer face;

Figure 4 is a fragmentary perspective view showing the two panels in their mounted position but before shift of the second panel toward the strip equipped panel;

Figure 5 is a perspective view of the two panels showing the one panel after removal of the holland facing from the inner face of the strip of unvulcanized rubber;

Figure 6 is a perspective view of the two panels showing the second panel after it has been moved toward the one panel in order to bring its coating of rubber-resin type cement into contact or abutment with the opposed face of the unvulcanized rubber strip and thus to complete the formation of the joint;

Figure 7 is a fragmentary perspective view of a pair of panels having therebetween a joint embodying a second form of the invention; and Figures 8 and 9 are fragmentary perspective views illustrating certain of the steps which are involved in forming the joint of Figure 7.

The joint which is shown in Figures 1 to 6, inclusive, constitutes one form or embodiment of the invention. It is shown in connection with a pair of glass panels P and P¹ and consists of a strip 10 of unvulcanized rubber and a pair of cement coatings 11 and 12 at the sides of the strip. The panels P and P¹ are adapted to be mounted at the place of use or installation in edge to edge relation by way of a frame or suitable mounting means (not shown). The joint of Figures 1 to 6 serves as a waterproof seal between the adjacent edges of the two panels. The strip 10 of unvulcanized rubber forms a cushion between the two panels and is preferably composed or formed of the following ingredients in substantially the proportions specified:

| | Parts by weight |
|---|---|
| Crude rubber | 20 |
| Reclaimed rubber | 21 |
| Reinforcing and color pigment | 59 |

In making the strip the aforementioned ingredients are compounded, milled, and then sheeted out onto a facing 13 of holland. Thereafter the sheeted material on the holland is cut into strips of the desired width. The strip 10 by reason of its ingredients is tacky and has great affinity for rubber cement. In addition, it is plastic or readily moldable and is slightly springy or elastic under normal atmospheric temperatures. When mounted in place between the adjacent edges of the panels P and P¹ the strip permits of expansion as well as contraction of the two panels. Preferably the strip 10 corresponds in width to the thickness of the panels. The coatings 11 and 12 serve to bond the unvulcanized rubber strip 10 to the adjacent edges of the panels and are preferably formed of the following permanently tacky cementitious material in substantially the proportions specified:

| | Parts by weight |
|---|---|
| Reclaimed rubber | 44 |
| Resin | 44 |
| Pigments and color | 12 |

These materials are suitably compounded or mixed together and are dissolved in benzol, naphtha, carbon tetrachloride or any other rubber solvent. Preferably three and one-half pounds of the compounded cementitious material are dissolved in one gallon of solvent in order that the cement is of such thinness or liquidity that it may be applied by way of a brush or similar instrument for coating forming purposes. The resin serves to make the cement permanently tacky and because of its affinity or attraction to glass causes the coatings 11 and 12 to bond or unite themselves securely to the adjacent edges of the glass panels.

In forming the joint of Figures 1 to 6, inclusive, the coating 11 is applied to the proper edge of the panel P at the shop or other establishment where the panel is cut. This is done or accomplished by brushing a sufficient quantity of the aforementioned rubber-resin cement onto the proper edge of the panel in order completely to cover such edge (see Figure 2). After drying or evaporation of the solvent part of the cement, the strip 10 of unvulcanized rubber is applied to the coating (see Figure 3). This is done by pressing the exposed face of the strip, that is, the face without the holland facing 13 against the outer face of the coating 11. The strip 10 is applied so that it extends lengthwise of the coating 11 and is preferably pressed into adhering relation with the coating. After application of the unvulcanized rubber strip 10 to the coating 11 the holland facing 13 serves as a protector for the outer face of the strip. After application of the coating 11 and the holland faced strip 10 to the panel P said panel is moved to the place of installation or use and is then suitably mounted in place. Thereafter, the panel P¹ is suitably mounted in place but with a small space between it and the panel P. After such mounting of the panel P¹ the coating 12 of permanently tacky rubber-resin cement is applied to the edge of the panel P¹ which is opposite to the strip equipped edge of the panel P. The coating 12 is applied similarly to the coating 11, that is, by brushing the cement so that it completely covers the proper edge of the panel P¹. Directly after evaporation of the cement solvent the holland facing 13 is removed from the strip 10 (see Figure 5) and thereafter the panel P¹ is slid or shifted laterally in order to bring the coating 12 into contact or abutment with the adjacent face of the unvulcanized rubber strip 10, as shown in Figure 6. As soon as the cement solvent evaporates from the coating 12 the joint is complete and serves as a substantially permanent waterproof seal between the adjacent edges of the panels P and P¹. The joint because of the fact that it includes the unvulcanized rubber strip 10 and the permanently tacky cement coatings 11 and 12 accommodates expansion of the panels and also expands in connection with contraction of the panels. It has comparatively long life and may be applied with facility due to the fact that the major part of its application may be done at the shop or other establishment where the panels are cut or fabricated. Because of the plastic nature of the strip and coatings, the joint adapts itself to any commercial irregularities and high and low spots in the adjacent edges of the two panels and it is not necessary to apply a cementitious void filling material in order to complete the joint. The joint because of its simplicity may be manufactured at a low and reasonable cost.

The joint which is shown in Figures 7 to 9, inclusive, constitutes another form of the invention. It is shown in connection with a pair of glass panels P² and P³ and consists of a pair of abutting unvulcanized rubber strips 14 and 15, and a pair of coatings 16 and 17 between the strips and the adjacent edges of the two panels P² and P³. The strips 14 and 15 are associated with the coatings 16 and 17, respectively, and are formed of the same rubber composition material as the strip 10 of the joint of Figures 1 to 6, inclusive. They are preferably the same in length and width and before being brought into abutment with one another in connection with mounting of the panels P² and P³ embody holland facings 18 and 19. These facings are associated with the strips 14 and 15, respectively, and are adapted to protect the outer faces of the strips during transportation of the panels P² and P³ to their place of installation or use. The coatings 16 and 17 are formed of the same rubber-resin type cementitious material as the coatings 11 and 12 of the first described joint. They are adapted to be applied to the adjacent edges of the two panels P² and P³ by a brush and serve to bond unvulcanized rubber strips 14 and 15 to the panels. In connection with formation of the joint the panels P² and P³ are equipped with their respective cement coatings and strips at the shop or establishment where they are cut or fabricated. This is done by spreading on the proper edge of the panel P² a sufficient amount of permanently tacky rubber-resin type cement to form the coating 16 and then after evaporation of the rubber solvent applying the unvulcanized rubber strip 14 in such manner that the holland backing 18 is exteriorly disposed. It is further accomplished by applying the coating 17 to the proper edge of the panel P³ and then applying the unvulcanized rubber strip 15 to the coating in such manner that it extends longitudinally of the coating and the holland facing 19 is on the outside. After mounting of the two panels P² and P³ at their place of installation but before shifting the panels together the holland facings 18 and 19 are stripped from the strips 14 and 15 (see Figure 9). Thereafter, the exposed face of one of the unvulcanized rubber strips is moistened or swabbed with a rubber solvent such as naphtha in order to render it extremely tacky. After the swabbing operation the panels are shifted together or one is moved toward the other in order to bring the opposed faces of the strips 14 and 15 into abutment. Because of the nature of the rubber material of which the two strips are formed the strips immediately upon being brought into contact with one another bond and become permanently united together (see Figure 7). As soon as the strips 14 and 15 become bonded together as a result of cohesion a composite unvulcanized rubber strip is created between the two panels and the joint is complete and serves as an effective waterproof and permanent seal between the two panels P² and P³. The joint of Figures 7 to 9, inclusive, is simple as far as designed and construction are concerned and may be manufactured at a low and reasonable cost. It effectively fulfills its intended purpose and entails only stripping of the holland facings 18 and 19 at the place of installation of the two slabs.

The term "unvulcanized rubber strip" is intended to cover a strip which is made from crude rubber and reclaimed rubber, inasmuch as when reclaimed rubber is milled together with crude rubber and reinforcing and color pigments the resultant mass has the characteristics and properties of pure unvulcanized rubber.

Whereas the two forms or types of joints have been described in connection with glass panels, it is to be understood that they have other capabilities of use and may be used with panels of other material. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. A waterproof joint for sealing the adjacent edges of a pair of panels in edge to edge relation, comprising a strip of tacky unvulcanized rubber extending longitudinally of and between the edges of the panels, and coatings of cement extending between and bonded to the side faces of the strip and said adjacent edges of the panels.

2. A waterproof joint for sealing the adjacent edges of a pair of panels in edge to edge relation, comprising a strip of tacky, readily moldable, slightly elastic material extending longitudinally of and between the adjacent edges of the panels, and coatings of permanently tacky rubber-resin type cement extending between and bonded to the side faces of the strip and said adjacent edges of the panels.

3. A waterproof joint for sealing the adjacent edges of a pair of panels in edge to edge relation, comprising a strip of tacky unvulcanized rubber extending longitudinally of and between said adjacent edges of the panels, and coatings of permanently tacky rubber-resin type cement completely covering and bonded to the side faces of the strip and the adjacent edges of the panels.

4. A waterproof joint for sealing panels in edge to edge relation, comprising a composite strip of tacky unvulcanized rubber extending longitudinally of and between the adjacent edges of the panels, and coatings of permanently tacky cement extending between and bonded to the side faces of the strip and said adjacent edges of the panels.

5. A waterproof joint for sealing panels in edge to edge relation, comprising a composite strip of tacky unvulcanized rubber extending longitudinally of and between the adjacent edges of the panels, and coatings of permanently tacky rubber-resin type cement completely covering and bonded to the side faces of the strip and said adjacent edges of the panels.

6. A waterproof joint for sealing the adjacent edges of a pair of panels in edge to edge relation, comprising a pair of parallel strips of tacky unvulcanized rubber with certain of the side faces thereof pressed together into cohering relation, and coatings of permanently tacky rubber-resin type cement completely covering and bonded to the other side faces of the strips and said adjacent edges of the panels.

7. That improvement in forming a waterproof joint between a pair of panels, which comprises first applying a coating of permanently tacky pressure sensitive adhesive to one edge of one of the panels, then applying to and lengthwise of the coated edge of said one panel a strip of tacky, readily moldable, slightly elastic material having a coextensive facing of holland on its outer face, then applying a coating of permanently tacky cement to one edge of the second panel, and finally removing the holland facing from the outer face of the strip and moving one panel relatively to the other in order to bring the cement coated edge of said second panel into abutment with said outer face of the strip.

8. That improvement in forming a waterproof joint between a pair of panels, which comprises applying a coating of permanently tacky cement to one edge of one of the panels and applying to, and lengthwise of, the coated edge of said one panel a strip of tacky, readily moldable, slightly elastic material having a coextensive facing of holland on its outer face, applying a coating of permanently tacky cement to one edge of the second panel and applying to and lengthwise of the coated edge of said second panel a strip of tacky readily moldable highly elastic material with a coextensive facing of holland on its outer face, and finally removing the two holland facings from their respective strips and moving one panel relatively to the other in order to bring the outer faces of the strips into abutment with one another.

9. That improvement in forming a waterproof joint between a pair of panels, which comprises applying a coating of permanently tacky cement to one edge of one of the panels and applying to and lengthwise of the coated edge of said one panel a strip of tacky unvulcanized rubber with a coextensive facing of holland on its outer face, applying a coating of permanently tacky cement to one edge of the second panel and applying to, and lengthwise of, the coated edge of said second panel a strip of tacky unvulcanized rubber having a holland facing on its outer face, removing the two facings of holland from their respective strips and applying a rubber solvent to the outer face of one of the strips, and finally before evaporation of the solvent moving one panel relatively to the other in order to bring the outer faces of the two strips into abutment with one another.

PAUL VAN CLEEF.